United States Patent
Golden

[11] 3,753,643
[45] Aug. 21, 1973

[54] WICK-BURNING CANDLE WITH MULTIPLE POINTS OF LIGHT EMISSION IN ITS BODY

[76] Inventor: Eddie R. Golden, 6912 Redwood Hwy., Grants Pass, Oreg. 97526

[22] Filed: June 21, 1972

[21] Appl. No.: 264,767

[52] U.S. Cl.............. 431/126, 431/288, 240/1 LP
[51] Int. Cl............................................ F23q 2/32
[58] Field of Search.................. 431/288, 289, 126; 240/1 LP, 10 C

[56] References Cited
UNITED STATES PATENTS
3,532,874  10/1970  Rosenast.......................... 240/1 LP Primary Examiner—Carroll B. Dority, Jr.
Attorney—Clarence M. Crews et al.

[57] ABSTRACT

A wick-burning candle is provided which includes a body of conventional, moldable, combustible material and which is characterized by the fact that it further includes a multiplicity of light transmitting fibers whose introductory ends are directly exposed to the candle flame and whose light emitting ends are located at distributed points in the periphery of the candle, so that the lighting of the candle causes the points of light emission in the candle body to glow.

5 Claims, 4 Drawing Figures

Patented Aug. 21, 1973 3,753,643

INVENTOR:
EDDIE R. GOLDEN
by: *[signature]*
HIS ATTORNEY

WICK-BURNING CANDLE WITH MULTIPLE POINTS OF LIGHT EMISSION IN ITS BODY

This invention relates to a novel and intriguing, wick-burning candle, having numerous points of light emission in the sides of its body, which light emitting points become activated by the mere lighting of the candle.

There are available today optical fibers, adapted for association with a light source, such as an electric light bulb, for producing ornamental effects. Such optical fibers, as is well understood by those skilled in the art, have the capability of receiving incident light at one end and of transmitting it for conspicuous discharge at the other end without substantial perceptible loss of intensity. These optical fibers have heretofore been utilized to pick up light from an electric light bulb, and to transmit it through outgoing radiating sprays of optical fibers. The electric light bulb has no tendency to melt or burn the optical fibers. The resulting structure, therefore, has no tendency to melt, burn or otherwise consume the optical fibers.

What I have contrived is a novel and intriguing candle of an entirely different nature, in which a group of optical fibers is embedded or enclosed within the body of a wick-burning candle with the upper fiber ends exposed to the light and heat emitted by the burning candle wick, and the lower ends flared outward to extend to or beyond the lateral walls of the candle body, so that the candle light incident on the upper ends of the fibers is transmitted efficiently to the lower ends of the fibers and emitted by such lower ends.

In order to achieve and efficiently maintain an effect of this kind, it is essential 1. that optical fibers be chosen which have the capability of receiving candle light through their vertically extending upper ends, transmitting it from end to end of each curved fiber and discharging it laterally through the substantially radiating lower ends of the fibers;

2. that the optical fibers be adapted to be melted and/or burned away at their upper end as the wick and the wax or tallow of the candle are consumed, so that the upper fiber ends will remain intact, will be constantly exposed to the candle light, and pointed in the general direction of the flame and will be maintained at a generally uniform distance from the candle flame; and 3. that as the upper ends of the optical fibers are melted and/or burned such upper ends tend to assume and maintain generally spherical light-collecting shapes for collecting and concentrating the light within the fibers.

With this kind of arrangement, the lighting of the candle has the mystifying and seemingly improbable consequence of continuously illuminating various specific points in the periphery of the candle body.

Other objects and advantages will hereinafter appear.

In the drawing forming part of this specification,

Figure 1:
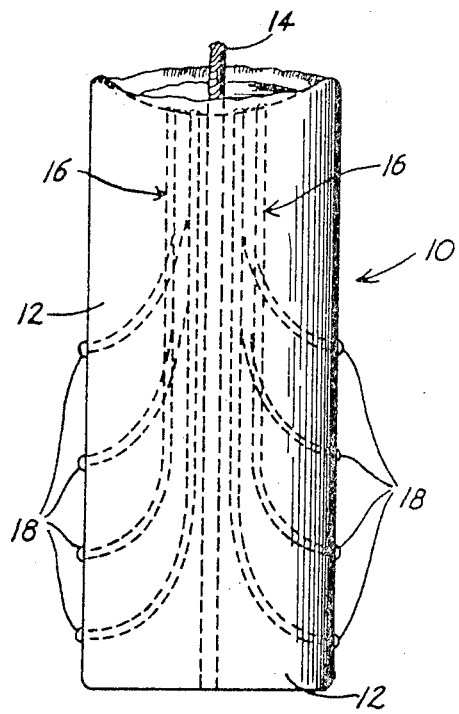
FIG. 1 is a view in elevation of a partially consumed, wick-burning candle, which constitutes a practical and advantageous, illustrative embodiment of the invention.
Figure 2:
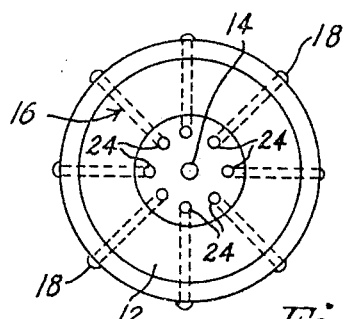
FIG. 2 is a plan view of the candle of FIG. 1.
Figure 3:
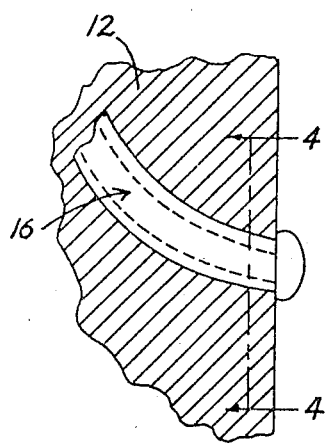
FIG. 3 is an enlarged, fragmentary view in sectional elevation showing the embedded discharge end of a single fiber.
Figure 4:
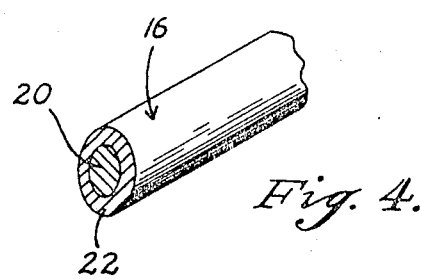
FIG. 4 is a sectional view of a single fiber, the section being taken along the line 4—4 of FIG. 3, looking in the direction of the arrows.

The illustrative candle 10 is composed chiefly of generally conventional materials, including a body 12 of low melting, moldable and combustible material such as tallow or paraffin, and a central combustible wick 44.

Fixed within the candle body are numerous optical fibers 16, each of which extends substantially vertically at the upper end thereof but is curved to extend through the lateral wall of the candle in a generally or substantially horizontal direction.

The candle body may be pre-molded with passages for the fibers formed in it, or the candle body may be molded about the wick and the fibers.

In either case, the lower ends of the fibers may be trimmed off flush with the lateral surface of the candle. As shown in the drawing, however, each fiber may have a protruding lower end melted off by a flame or by a heated body like a soldering iron, in which case the remaining terminal end 18 will be globular in form as shown.

If the material of the fibers 16 is propely chosen, each fiber 16 may advantageously consist of a light transmitting core 20 and a reflecting clad 22, the clad having a lower index of refraction than the core.

If the fiber materials are properly chosen the fibers 16 will be melted and then burned away at their upper ends by the heat of the flame.

Because of this characteristic the upper end 24 of each fiber will be globular in form, will point toward the flame and will be continuously maintained at a substantially uniform distance from the flame.

A fiber of the kind described can advantageously be the DuPont product known as "Crofon," but a variety of other fibers may be employed with advantage. A fiber having a light conducting core of polystyrene having an index of refraction of 1.60 and a jacket of polymethylmethacrylate having an index of refraction of 1.49 is suitable.

I have described what I believe to be the best embodiments of my invention. What I desire to secure by letters patent is set forth in the following claims.

I claim:

1. A novel candle which includes, in combination, a body composed of moldable and combustible material, a wick which serves in the conventional way as a light producing source when ignited, and a multiplicity of optical fibers each having a generally vertically disposed light-receiving upper end which extends through the upper end of the candle body and a generally horizontally disposed light emitting lower end which extends through the lateral wall of the candle body, each optical fiber having the capability of picking up light from the burning wick at its upper end, transmitting it through the candle body and radiating it through its lower end, so that numerous spots of illumination originating at the flame appear in the lateral walls of the candle.

2. A novel candle as set forth in claim 1 in which each optical fiber includes a light conducting core and a light reflecting clad.

3. A novel candle as set forth in claim 2 in which the core and clad of each optical fiber are both transparent and the core has a substantially higher index of refraction than the clad.

4. A novel candle as set forth in claim 1 in which each optical fiber is responsive to the heat of the candle flame, being caused thereby to recede as the candle is consumed, and to maintain at the upper end of each fiber a globular, light condensing formation.

5. A novel candle as set forth in claim 1 in which each optical fiber includes at its exposed lower end a globular structure through which the received light is radiated.

* * * * *